US008547590B2

(12) United States Patent
Bang et al.

(10) Patent No.: US 8,547,590 B2
(45) Date of Patent: Oct. 1, 2013

(54) DETERMINING A RESOLUTION OF A DEVICE BASED ON A CALCULATED PRINCIPAL SPATIAL FREQUENCY RESPONSE (SFR) SELECTED FROM A CALCULATED SFR (75) Inventors: Yousun Bang, Seoul (KR); Sang-ho Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1692 days.

(21) Appl. No.: 11/953,225

(22) Filed: Dec. 10, 2007

(65) Prior Publication Data
US 2009/0015848 A1 Jan. 15, 2009

(30) Foreign Application Priority Data

Jul. 12, 2007 (KR) .................. 10-2007-0070116

(51) Int. Cl.
G06F 15/00 (2006.01)
(52) U.S. Cl.
USPC .......................................... 358/1.2
(58) Field of Classification Search
USPC .......................................... 358/1.2
See application file for complete search history.

(56) References Cited

U.S. PATENT DOCUMENTS

| 7,593,603 B1 * | 9/2009 | Wilensky ............... 382/311 |
| 2003/0020776 A1 | 1/2003 | Franzke et al. |
| 2005/0080900 A1 * | 4/2005 | Culbertson et al. ....... 709/226 |

FOREIGN PATENT DOCUMENTS

JP   2006-129405   5/2006

OTHER PUBLICATIONS

Burns, P. et al., *Refined Slanted-Edge Measurement for Practical Camera and Scanner Testing*, IS&T 2002 PIC Conference, pp. 191-195, Apr. 1, 2002.
*Optical resolution*, Wikipedia, http://en.wikipedia.org/Optical_resolution, Sep. 2006.
Burns, Peter, *sfrmat 2.0 User's Guide*, http://citeseerx.ist.psu.edu/viewdoc/download?doi=10.1.1.105.909&rep=rep1&type=pdf, Aug. 12, 2003.
Burns, Peter D., *Slanted-Edge MTF for Digital Camera and Scanner Analysis*, Proc. IS&T 2000 PICS Conference, pp. 135-138, Mar. 1, 2000.
Extended European Search Report, mailed Nov. 18, 2010, in corresponding European Application No. 08103126.2 (8 pp.).
Chinese Office Action issued Aug. 10, 2011 in corresponding Chinese Patent Application No. 200810095384.4.
Ming Li "Study on the Testing Methods of the Resolution of HDTV Cameras", Beijing Film Academy, Feb. 2005, pp. 30-32.
Chinese Office Action dated May 2, 2012 issued in corresponding Chinese Patent Application No. 200810095384.4.
Jun Hasegawa et al., "Measurement-Based Objective Metric for the Printer Resolution", Image Quality and System Performance IV, Proceedings of the SPIE-IS&T Electronic Imaging, vol. 6494, 64940D-1, Jan. 2007 (11 pages).

* cited by examiner

*Primary Examiner* — Eric A Rust
(74) *Attorney, Agent, or Firm* — Staas & Halsey LLP

(57) ABSTRACT

An apparatus and method of calculating a resolution. The method of calculating a resolution includes selecting a region having an edge from a test chart, calculating a spatial frequency response (SFR) of an image forming device that has printed the test chart from the selected region, setting a frequency that corresponds to a principal SFR among the calculated SFRs of the image forming device as a principal frequency of the SFR of the image forming device, and judging the set principal frequency as the resolution of the image forming device.

31 Claims, 7 Drawing Sheets

<SPATIAL DOMAIN>

FIG. 4C

<FREQUENCY DOMAIN>

DETERMINING A RESOLUTION OF A DEVICE BASED ON A CALCULATED PRINCIPAL SPATIAL FREQUENCY RESPONSE (SFR) SELECTED FROM A CALCULATED SFR

CROSS-REFERENCE TO RELATED APPLICATION

This application claims all benefits accruing under 35 U.S.C. §119 of Korean Patent Application No. 2007-70116, filed on Jul. 12, 2007 in the Korean Intellectual Property Office, the disclosure of which is incorporated herein by reference.

BACKGROUND OF THE INVENTION

1. Field of the Invention

Aspects of the present invention relate to an apparatus and method of calculating a resolution, and, more particularly, to an apparatus and method of calculating a resolution that can reflect physical characteristics and software characteristics of an image forming device by calculating a resolution that reflects the characteristic of an edge.

2. Related Art

An image forming device having a print function, such as a printer, a facsimile machine, and a multifunction device, forms an image on a printable medium using a mechanical engine, such as a laser scanning unit, a photoconductive drum, a developing roller, a feed roller, and the like. The resolution of the image formed on the printable medium is expressed by DPI (Dots Per Inch). DPI indicates the number of pixels or dots printed per inch. For example, a resolution of 600 dpi indicates that the image forming device prints 600 pixels or dots per inch.

The resolution of the printed image is affected by the mechanical engine or by an algorithm, such as an algorithm to process the sharpness of an edge. Accordingly, the resolution and sharpness of images printed by image forming devices having the same resolution, e.g., 600 dpi, may differ depending on their manufacturers, models, or print options.

Figure 1A:
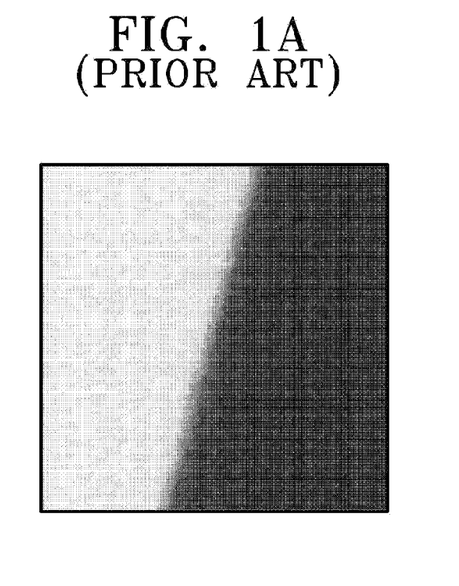
FIGS. 1A and 1B illustrate examples of printed matters obtained from image forming devices having the same resolution.
Figure 1B:
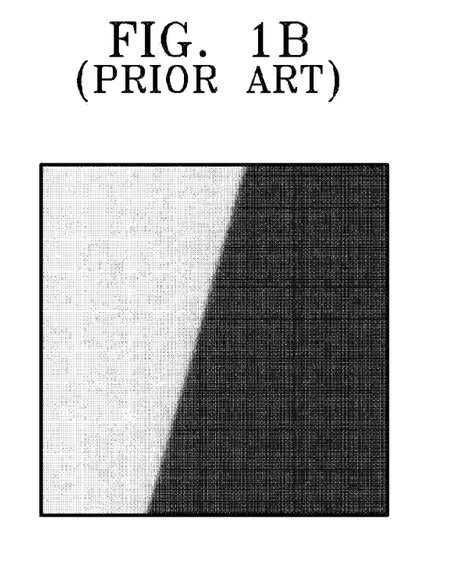

FIGS. 1A and 1B show examples of printed matters obtained from image forming devices having the same resolution. As shown in FIGS. 1A and 1B, although images printed with the same resolution through different image forming devices have the same resolution, the sharpness of edges and the sharpness of the images may differ. This is because the resolution used in conventional image forming devices reflects only the physical characteristics of the image forming devices, such as how many dots are printed in a region of one inch, but does not reflect how sharp the edge or line is in vision. Accordingly, in expressing the resolution of the images as shown in FIGS. 1A and 1B of the image forming device, there is a need to calculate and express a more accurate resolution through reflection of the degree of sharpness of an edge or line of a printed image.

SUMMARY OF THE INVENTION

Aspects of the present invention provide an apparatus and method of calculating a resolution, which can calculate the resolution that reflects the degree of sharpness of an edge existing in a printed image.

Additional aspects and/or advantages of the invention will be set forth in part in the description which follows and, in part, will be obvious from the description, or may be learned by practice of the invention.

According to an aspect of the present invention, a method of calculating a resolution is provided. The method comprises selecting a region having an edge from a test chart; calculating a spatial frequency response (SFR) of an image forming device that has printed the test chart using the selected region; setting a frequency corresponding to a principal SFR among the calculated SFRs of the image forming device as a principal frequency of the SFR of the image forming device; and determining the set principal frequency as the resolution of the image forming device.

According to another aspect of the present invention, the resolution of the image forming device is determined by calculating the set principal frequency in terms of DPI (Dots Per Inch).

According to another aspect of the present invention, the method further comprises scanning the printed test chart; wherein the region having the edge is selected from the scanned test chart.

According to another aspect of the present invention, the calculating of the SFR of the image forming device comprises calculating an SFR of a scanner that has scanned the test chart; calculating an SFR of the selected region; and calculating the SFR of the image forming device using the SFR of the scanner and the SFR of the selected region.

According to another aspect of the present invention, the step of calculating the SFR of the selected region may comprise calculating an average value of luminance of respective lines based on a direction in which the edge is formed with respect to the selected region; and obtaining the SFR of the selected region by converting the calculated average value of luminance into a frequency domain.

According to another aspect of the present invention, the SFR of the image forming device is by dividing the SFR of the selected region by the SFR of the scanner.

According to another aspect of the present invention, the method further comprises if plural test charts are printed, selecting regions that include the edge from the respective test charts; calculating the SFRs of the image forming device from the respective selected regions; setting the principal frequencies corresponding to the principal SFRs from the calculated SFRs of the image forming device; and calculating an average of the respective principal frequencies and determining the average as the resolution of the image forming device.

According to another aspect of the present invention, the method further comprises if plural regions having the edge are selected from the test chart, calculating the SFRs of the image forming device from the respective selected regions; calculating an average of the calculated SFRs of the image forming device; setting the principal frequency corresponding to the principal SFR from the calculated average of the SFRs of the image forming device; and determining the set principal frequency as the resolution of the image forming device.

According to another aspect of the present invention, the test chart is composed of a black space and a white space, and the edge may be formed on a boundary between the black space and the white space.

According to another aspect of the present invention, the edge is formed in a direction of a slanted line.

According to another aspect of the present invention, the method further comprises removing noise by modeling the calculated SFR of the image forming device.

According to another aspect of the present invention, the principal SFR is the SFR that approaches 0 among the SFRs of the image forming device normalized to be in the range of 0~1.

According to another aspect of the present invention, an apparatus to calculate a resolution of an image forming device is provided. The apparatus comprises a calculation unit to calculate a spatial frequency response (SFR) of the image forming device that has printed a test chart from a selected region if the selected region has; a setting unit to set a frequency corresponding to a principal SFR among the calculated SFRs of the image forming device as a principal frequency of the SFR of the image forming device; and a judgment unit to determine the set principal frequency as the resolution of the image forming device.

According to another aspect of the present invention, the judgment unit determines the resolution of the image forming device by calculating the set principal frequency in terms of DPI (Dots Per Inch).

According to another aspect of the present invention, the calculation unit calculates an SFR of a scanner that has scanned the test chart and an SFR of the selected region, and calculates the SFR of the image forming device by dividing the SFR of the selected region by the SFR of the scanner.

According to another aspect of the present invention, the calculation unit calculates an average value of luminance of respective lines based on a direction in which the edge is formed with respect to the selected region, and calculates the SFR of the selected region by converting the calculated average value of luminance into a frequency domain.

According to another aspect of the present invention, the calculation unit calculates the SFRs of the image forming device from respective regions selected from plural test charts if the plural test charts are printed; the setting unit sets the principal frequencies corresponding to the principal SFRs from the calculated SFRs of the image forming device; and the judgment unit calculates an average of the respective principal frequencies and determines the average as the resolution of the image forming device.

According to another aspect of the present invention, the calculation unit calculates the SFRs of the image forming device from plural regions if the plural regions having the edge are selected and calculates an average of the calculated SFRs of the image forming device; the setting unit sets the principal frequency corresponding to the principal SFR from the calculated average of the SFRs of the image forming device; and the judgment unit determines the set principal frequency as the resolution of the image forming device.

According to another aspect of the present invention, the apparatus further comprises a modeling unit to removing noise by modeling the calculated SFR of the image forming device.

In addition to the example embodiments and aspects as described above, further aspects and embodiments will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
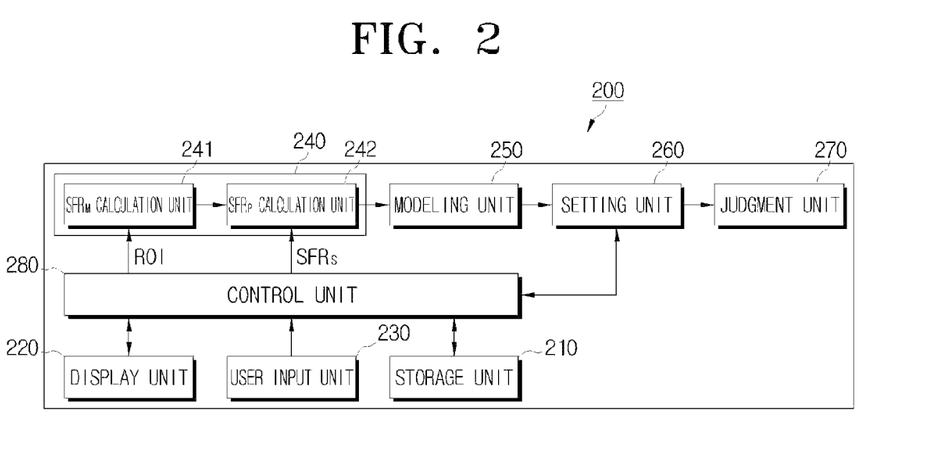
FIG. 2 is a block diagram illustrating the construction of an apparatus for calculating a resolution according to an example embodiment of the present invention.

FIG. 2 is a block diagram showing the construction of an apparatus 200 for calculating a resolution according to an example embodiment of the present invention. The resolution calculating apparatus 200 comprises a storage unit 210, a display unit 220, a user input unit 230, a calculation unit 240, a modeling unit 250, a setting unit 260, a judgment unit 270, and a control unit 280. The resolution calculating apparatus 200 calculates the resolution of an image forming device having a print function, which includes not only a physical characteristic indicating how many dots are printed per inch but also the sharpness of a line or an edge of a printed image. Examples of the image forming device include a printer, a facsimile machine, a multifunction device, and the like. According to other aspects of the invention, the resolution calculating apparatus 200 may contain additional and/or different units. Similarly, the functionality of two or more of the above units may be combined into a single component.

Figure 3:
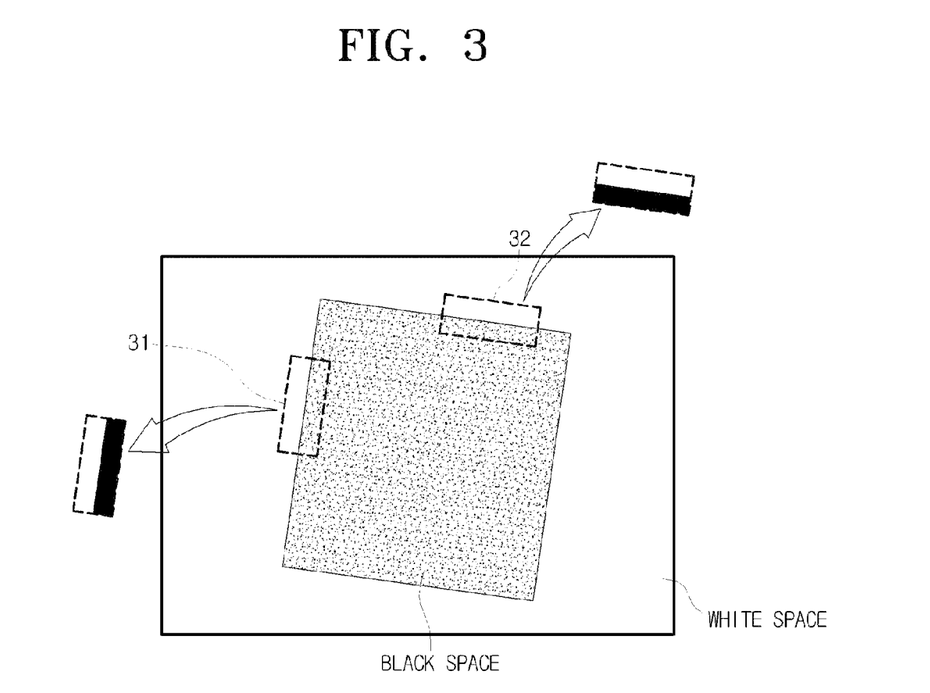
FIG. 3 illustrates an example of a test chart.

In order to calculate the resolution, as shown in FIG. 3, a designer first produces a test chart composed of a black space and a white space, in which an edge of a slanted line is formed on a boundary between the black space and the white space. The designer produces a test chart having black digital data and white digital data. Although the edge is shown in FIG. 3 as a slanted line, the slope of the edge may be set in the range of 0° to 360°. The test chart is an image designed to test the actual resolution reflecting inherent properties of the image forming device (not shown). The apparatus 200 may be provided in the image forming device or may be provided separately.

The designer prints the test chart by transmitting digital data corresponding to the test chart to the image forming device, and then acquires a scanned test chart by scanning the printed test chart using a scanner (not shown). The digital data of the scanned test chart is stored in the storage unit 210.

The image forming device prints the test chart with the existing resolutions of 600 dpi, 1200 dpi, and the like. In addition, a calibrated scanner is used as the scanner so that the resolution of the image forming device, which is measured by the resolution calculating apparatus 200, is not affected by the scanner. The scanner may be provided in the resolution calculating apparatus 200 or may be provided separately.

The designer pre-calculates an SFR (Spatial Frequency Response) of the scanner (not illustrated), which is required to calculate the SFR of the image forming device to be described later, and stores the SFR of the scanner in the storage unit 210. The SFR of the scanner is referred to as "$SFR_S$". According to ISO 16067-1, which defines the standard related to the calculation of $SFR_S$, $SFR_S$ is calculated by scanning a standardized chart called hard copy. Since this technique is known in the art, the detailed description thereof will be omitted.

The resolution calculating apparatus 200 will be briefly described. The calculation unit 240, if a region having an edge is selected from a test chart, calculates the SFR of the image forming device that has printed the test chart from the selected region. The SFR of the image forming device is referred to as "$SFR_P$".

The setting unit 260 sets the frequency corresponding to the principal $SFR_P$ among the calculated $SFR_P$s as the principal frequency of $SFR_P$. The judgment unit 270 determines the set principal frequency as the resolution of the image forming device that reflects the sharpness of the edge.

The storage unit 210 stores digital data of the test chart input from the scanner (not illustrated). The digital data of the test chart includes the positions and luminance values of respective pixels. The storage unit 210 stores programs required to drive and control the resolution calculating apparatus 200.

The display unit 220 processes and displays the digital data of the test chart stored in the storage unit 210. Accordingly, the test chart as shown in FIG. 3 is displayed through the display unit 220.

The user input unit 230 is a user interface, such as a mouse, a keyboard, touchpad, microphone, buttons, or other device capable of receiving input from the user. The user selects at least one region of interest (ROI) including an edge from the test chart being displayed on the display unit 220. For example, the designer, if he/she intends to calculate the resolution in a horizontal direction, selects a region 31 having an edge that is nearly a vertical line. Similarly, to calculate the resolution in a vertical direction, the user selects a region 32 having an edge that is nearly a horizontal line. The test chart of FIG. 3 is composed of a black space and a white space, in which the black space is expressed by hatching, indicating that the regions 31 and 32 are composed of a black space and a white space, respectively.

If a region having an edge is selected from the test chart being displayed, the calculation unit 240 calculates $SFR_P$ of the image forming device (not shown) that has printed the test chart from the selected region. For example, the calculation unit 240 may calculate $SFR_P$ using the luminance values of the respective pixels in the selected region. The calculation unit 240 comprises an $SFR_M$ calculation unit 241 and an $SFR_P$ calculation unit 242.

Figure 4A:
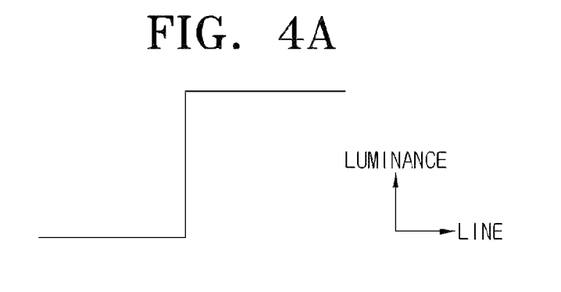
FIG. 4A illustrates an ideal example of an edge profile indicating an average value of luminance of a respective line.
Figure 4B:
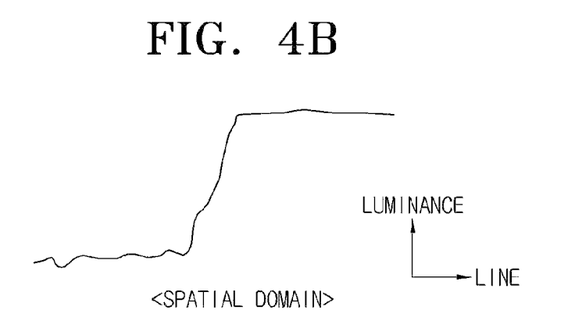
FIG. 4B illustrates an actual example of an edge profile indicating an average value of luminance of a respective line.

The $SFR_M$ calculation unit 241 calculates the average value of luminance of the respective line that is parallel to the direction of the edge based on a direction in which the edge is formed (e.g., a direction indicated by an arrow) with respect to the selected region. FIG. 4A shows an ideal example of an edge profile indicating an average value of luminance of a respective line, and FIG. 4B shows an actual example of an edge profile indicating an average value of luminance of a respective line. The edge profile as shown in FIG. 4B is a value calculated in a spatial domain.

The $SFR_M$ calculation unit 241 calculates the SFR of the selected region $SFR_M$ by converting the average value of the luminance of the respective line calculated in the spatial domain into a frequency domain. Specifically, the $SFR_M$ calculation unit 241 calculates the SFR of the selected region $SFR_M$ by performing a DFT (Discrete Fourier Transform) or FFT (Fast Fourier Transform) of the average value of the luminance of the respective line, i.e., the edge profile as shown in FIG. 4B. The calculated SFR of the selected region $SFR_M$ is inputted to the $SFR_P$ calculation unit 242. The SFR of the selected region is referred to as "$SFR_M$".

The $SFR_P$ calculation unit 242 compensates for $SFR_S$ using $SFR_S$ stored in the storage unit 210 and $SFR_M$ calculated by the $SFR_M$ calculation unit 241. The $SFR_P$ calculation unit 242 may calculate the $SFR_P$ using the following equation:

$$SFR_M = SFR_S \times SFR_P$$

Figure 4C:
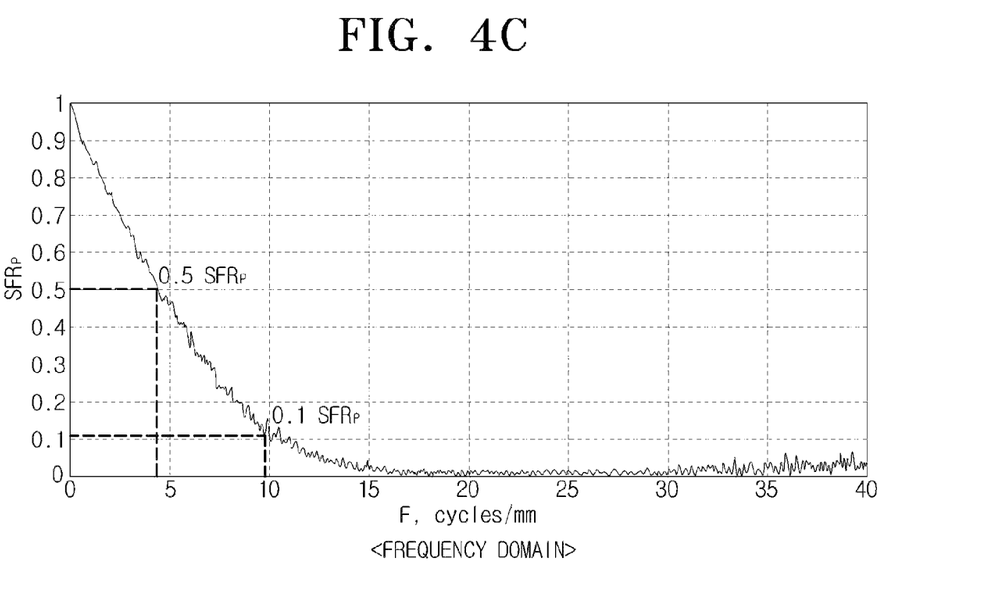
FIG. 4C illustrates an example of $SFR_P$ that is an SFR of an image forming device located in a frequency domain calculated by an $SFR_P$ calculation unit.

FIG. 4C shows an example of the $SFR_P$, the SFR of the image forming device located in a frequency domain calculated by the $SFR_P$ calculation unit 242. The SFR (Spatial Frequency Response) is a unit of resolution calculation, and is generally indicated as a graph of an output response to a unit amplitude input signal in a spatial frequency range. The SFR is normalized to have a value in the range of 0~1 in the spatial frequency. Accordingly, as shown in FIG. 4C, the SFR of the image forming device $SFR_P$ has a value in the range of 0~1, and the unit of frequency F is cycles/mm. For example, if the frequency is 10, 10 cycles exist per mm, and the period is repeated ten times.

Returning to FIG. 2, the modeling unit 250 performs a function modeling of $SFR_P$ in order to remove a noise of $SFR_P$ calculated by the $SFR_P$ calculation unit 242. For example, the modeling unit 250 may perform the modeling using a cubic spline function or a Cauchy function, although other functions may be used as well.

Figure 5:
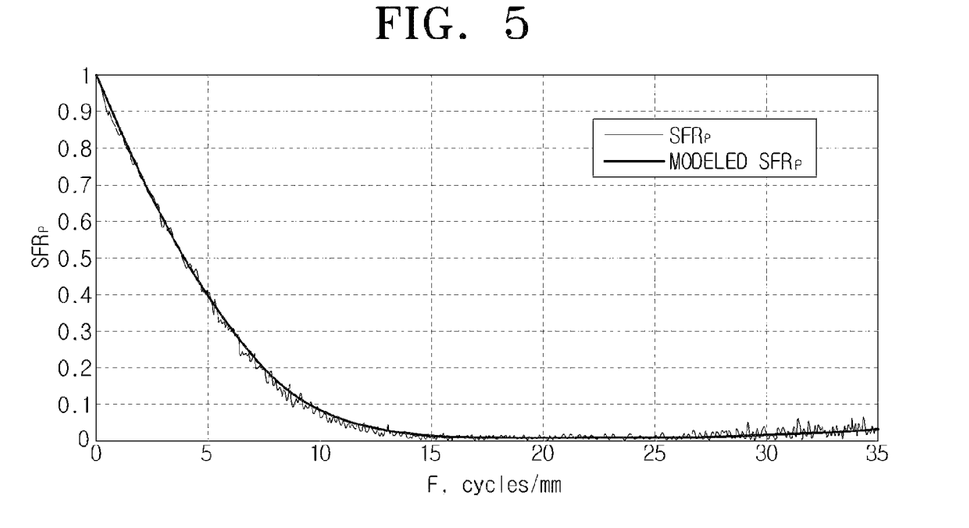
FIG. 5 illustrates an example of modeling $SFR_P$ using a spline function.

FIG. 5 shows an example of modeling $SFR_P$ using a spline function. As shown in FIG. 5, a thin line indicates $SFR_P$ calculated by the $SFR_P$ calculation unit 242, and a thick line indicates the modeled $SFR_P$.

The setting unit 260 sets the principal frequency of $SFR_P$ using the modeled $SFR_P$ as shown in FIG. 5. The setting unit 260 confirms the frequency corresponding to the principal $SFR_P$ among the modeled $SFR_P$s through a graph as shown in FIG. 5, and sets the confirmed frequency as the principal frequency of $SFR_P$.

The principal $SFR_P$ may be a value of one among $SFR_P$s in the graph as shown in FIG. 4C or FIG. 5. Since the difference between frequencies corresponding to SFRs of plural image forming devices $SFR_P$s becomes greater as the principal $SFR_P$ approaches 0, an $SFR_P$ near 0 may be set as the principal $SFR_P$.

Figure 6:
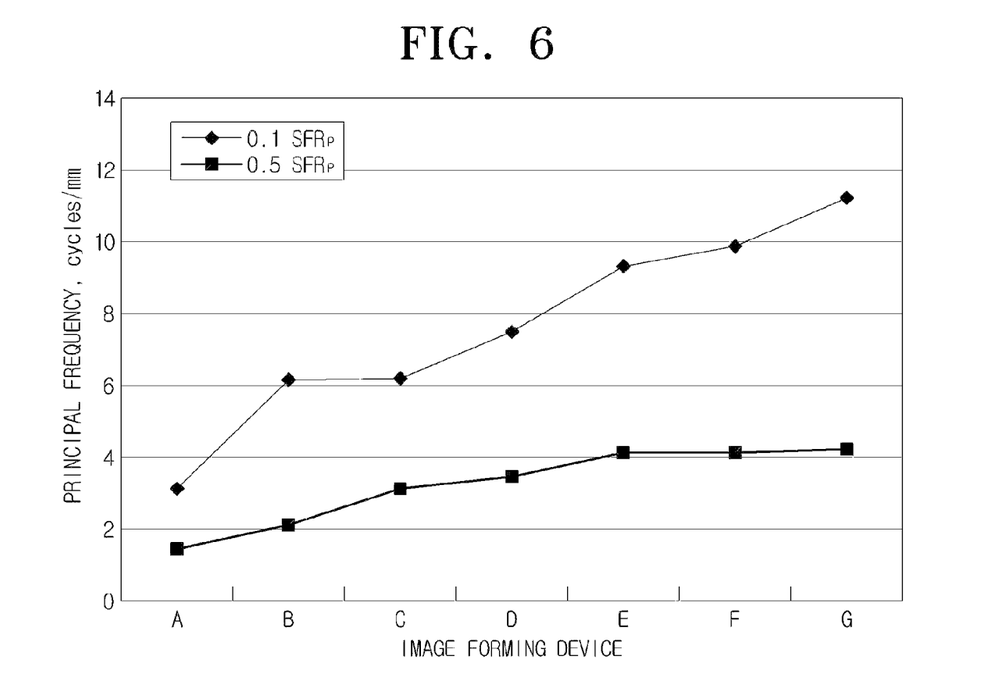
FIG. 6 illustrates an example of principal frequencies set from a plurality of modeled $SFR_P$s of image forming devices when "0.1" and "0.5" are set as principal $SFR_P$s.

FIG. 6 shows an example of principal frequencies set from a plurality of modeled $SFR_P$s of image forming devices when "0.1" and "0.5" are set as principal $SFR_P$s. In FIG. 6, A~G denote image forming devices. Principal frequencies shown by ♦ indicate frequencies corresponding to principal $SFR_P=0.1$ among the modeled $SFR_P$s of the image forming devices A~G, and principal frequencies shown by ■ indicate frequencies corresponding to principal $SFR_P=0.5$. As shown FIG. 6, when the principal $SFR_P=0.1$, rather than the principal $SFR_P=0.5$, the difference between the principal frequencies becomes greater.

Turning again to FIG. 2, the judgment unit 270 determines the principal frequency set by the setting unit 260 as the resolution of the image forming device (not shown) that reflects the sharpness of the edge. For example, if the principal $SFR_P$ is 0.1 and the corresponding principal frequency is 10 cycles/mm, the judgment unit 270 judges that the resolution of the image forming device is 10 cycles/mm. When expressing the resolution of the image forming device in units of dpi, the judgment unit 270 may use Equation (1) below.

Resolution of Image Forming Device (dpi)=Principal Frequency (cycles/mm)×25.4 (mm)×2 (pixels)     (1)

Referring to Equation (1), the principal frequency, which is a frequency corresponding to the principal $SFR_P$, refers to the number of cycles located in 1 mm, where one white pixel and one black pixel constitute one cycle. Since dpi is based on inches, the principal frequency is multiplied by 2.54 in order to calculate the principal frequency in terms of inches.

The control unit 280 controls the whole operation of the resolution calculating apparatus 200 according to the programs stored in the storage unit 210. For example, the control unit 280 provides luminance values of pixels corresponding to the region, for example, the region 31, selected from the test chart to the $SFR_M$ calculation unit 241, and provides $SFR_S$ of the scanner (not illustrated) stored in the storage unit 210 to the $SFR_P$ calculation unit 242.

The resolution (dpi) calculated by Equation (1) indicate not only the existing physical resolution but also the sharpness of the edge. For example, if the resolution calculated by the judgment unit 270 is 615 dpi when the image forming device prints the test chart with the resolution of 600 dpi, it means that the 600 pixels are printed in one inch with the edge processed more sharply. Accordingly, by calculating the resolution reflecting the physical characteristics and the software characteristics through a frequency response of the test chart having black and white regions and edges, it is possible to indicate the sharpness of the edge that can be expressed in the image forming device through the calculated resolution.

Figure 7:
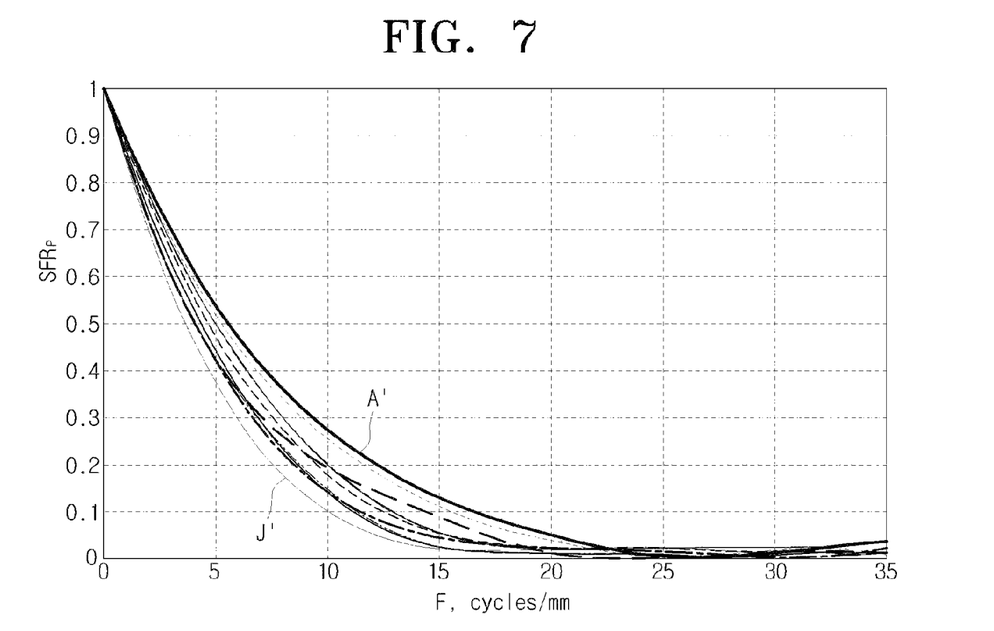
FIG. 7 illustrates an example of results of calculating and modeling a plurality of modeled $SFR_P$s of image forming devices.
Figure 8:
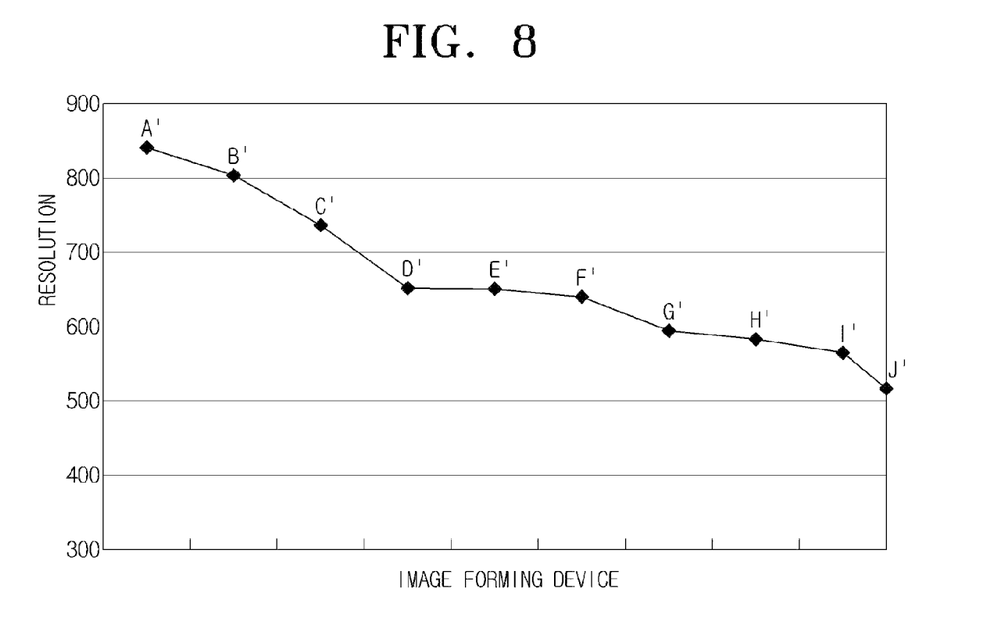
FIG. 8 illustrates an example of DPI calculated from a principal frequency that corresponds to a principal $SFR_P$ among modeled $SFR_P$s.

FIG. 7 shows an example of the results of calculating and modeling a plurality of modeled $SFR_P$s of image forming devices. FIG. 8 shows an example of dpi calculated from a principal frequency corresponding to a principal $SFR_P$ among modeled $SFR_P$s.

As shown in FIGS. 7 and 8, A'~J' denote image forming devices, and $SFR_P$ means SFRs of the respective image forming devices. In order to obtain the graph as shown in FIG. 7, the designer prints the same test chart through the image forming devices A'~J', respectively, and scans the printed test charts through the same scanner (not illustrated). The calculation unit 240 calculates $SFR_P$s of the respective image forming devices A'~J' from the respective scanned test charts. The modeling unit 250 performs modeling of $SFR_P$s of the image forming devices A'~J' using a modeling function to output the results as shown in FIG. 7.

Table 1 below shows principal frequencies corresponding to principal $SFR_P=0.1$ acquired from the results of modeling as shown in FIG. 7 and converted resolutions of the principal frequencies.

TABLE 1

| Image Forming Device | Principal Frequency (cycles/mm) corresponding to 0.1 $SFR_P$ | Converted Resolution (dpi) |
|---|---|---|
| A' | 16.6 | 845 |
| B' | 15.9 | 806 |
| C' | 14.6 | 739 |
| D' | 12.9 | 653 |
| E' | 12.9 | 653 |
| F' | 12.7 | 643 |
| G' | 11.7 | 595 |
| H' | 11.5 | 586 |
| I' | 11.1 | 566 |
| J' | 10.0 | 518 |

Referring to Table 1, A'~J' denote image forming devices. Converted resolutions indicate the resolutions that reflect the edge characteristics calculated from the principal frequencies corresponding to 0.1 $SFR_P$ in FIG. 7. FIG. 8 shows a graph to which the data in Table 1 is applied. The image forming devices A'~J' print the test charts with the same physical resolution, for example, with the resolution of 600 dpi.

As can be seen from Table 1 and FIG. 8, the resolutions calculated by reflecting the characteristics (such as sharpness of the edge) differ for the respective image forming devices A'~J'. The image forming process which has best processed the sharpness of the edge is A. Accordingly, in the case of calculating the resolution according to aspects of the present invention, not only the physical resolution but also the characteristic of the edge can be reflected, and thus more accurate resolution of the image forming device can be provided.

According to aspects of the present invention, one region is selected from a text chart displayed on the display unit 220, and the resolution that reflects the edge is calculated. In addition, the resolution calculating apparatus 200 may calculate the resolution by printing the digital data of the same test chart through one image forming device (not shown) several times. In this case, the scanned data of the printed test charts are stored in the storage unit 210, and the respective scanned test charts are displayed on the display unit 220. The designer may select regions having the same position or regions having different positions from the plural test charts being displayed on the display unit 220.

For example, when 10 test charts are printed, 10 regions including the edge are selected, and thus the calculation unit 240, the modeling unit 250, and the setting unit 260 perform the above-described operation 10 times in order to obtain the principal frequencies from the selected region. The judgment unit 270 calculates the average of 10 principal frequencies obtained from $SFR_P$s of the respective regions, and determines the calculated average value as the resolution that reflects the edge characteristic of the image forming device (not illustrated). When expressing the resolution in the unit of dpi, the judgment unit 270 calculates the average value in terms of dpi using Equation (1), and determines the calculated average value as the resolution that reflects the edge of the image forming device.

Figure 9:
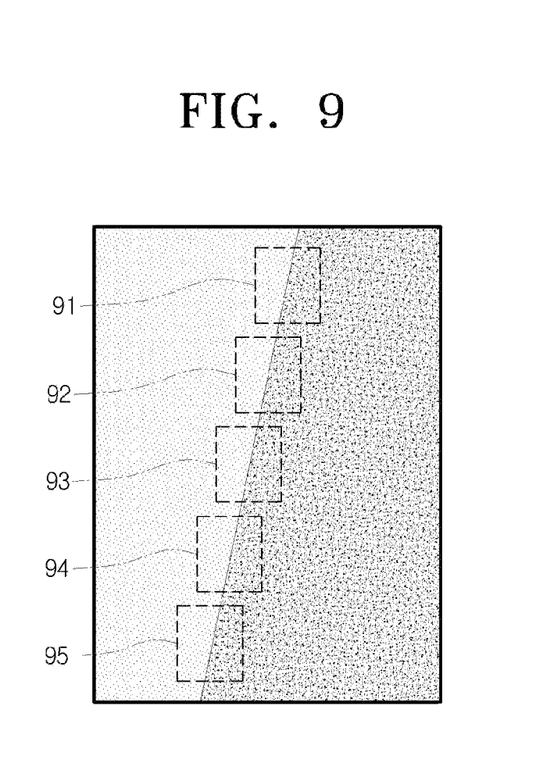
FIG. 9 illustrates an example of selecting a plurality of regions from a test chart.

As another example, the resolution calculating apparatus 200 may calculate the resolution that reflects the edge characteristic by selecting a plurality of regions from one test chart displayed on the display unit 220. FIG. 9 shows an example of selecting a plurality of regions from a test charts. When the test chart as shown in FIG. 9 is displayed on the display unit 220, the designer may select a plurality of regions, e.g., 91~95 by manipulating the user input unit 230.

The calculation unit 240 calculates $SFR_M$s from the luminance values of the pixels located in the selected regions 91–95, and then calculates an average $SFR_M$. Thereafter, the calculation unit 240 calculates one $SFR_P$ from the calculated average $SFR_M$.

The modeling unit 250 performs a modeling of the calculated $SFR_P$ as shown in FIG. 5. The setting unit 260 sets the principal frequency corresponding to the principal $SFR_P$ from $SFR_P$. The judgment unit 270 judges the principal frequency as the resolution of the image forming device, or converts the resolution into dpi using Equation (1). The calculation unit 240 may calculate the respective $SFR_P$s corresponding to the respective $SFR_M$s, and then calculate the average value of the respective $SFR_P$s. The modeling unit 250 then performs a modeling of the average $SFR_P$.

Figure 10:
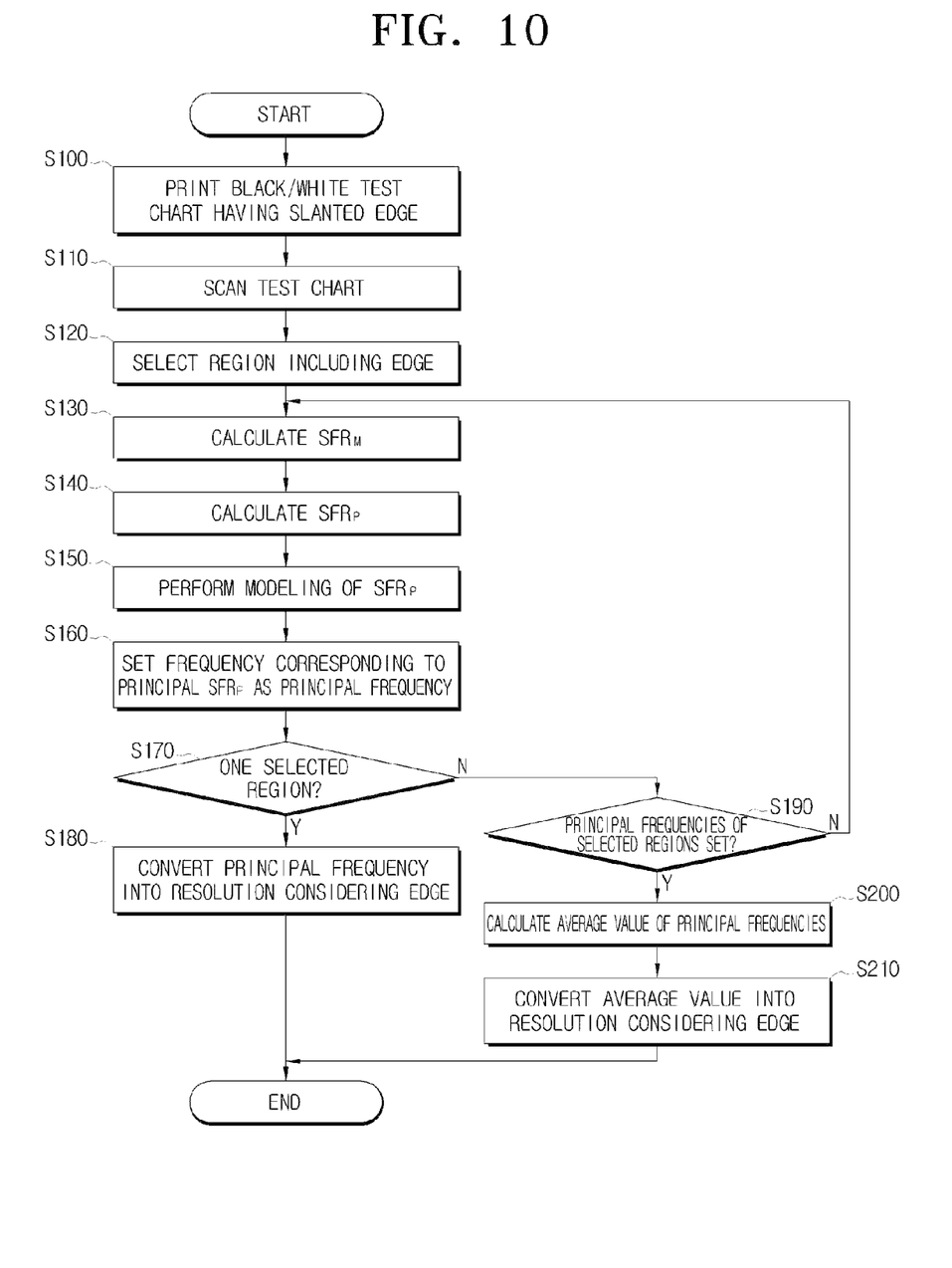
FIG. 10 is a flowchart of a process of calculating a resolution of an image forming device according to an example embodiment of the present invention.

FIG. 10 is a flowchart of a process of calculating a resolution of an image forming device according to an example embodiment of the present invention. Referring to FIGS. 2 to 10, the designer generates a black/white test chart having a slanted edge, as shown in FIG. 3, and prints the test chart through the image forming device (not shown) at block S100. The printed test chart is scanned through a calibrated scanner, and the digital data of the scanned test chart, i.e., the digital data including luminance values of the respective pixels, is stored in the storage unit 210 at block S110.

The designer displays the test chart on the display unit 220 by manipulating the user input unit 230. If at least one region that includes the edge is selected from the test chart at block S120, the control unit 280 reads the luminance values of the respective pixels that constitute the selected region ROI from the storage unit 210, and outputs the read luminance values to the $SFR_M$ calculation unit 241.

The $SFR_M$ calculation unit 241 calculates $SFR_M$ from the luminance values of the selected region at block S130. The $SFR_M$ calculation unit 241 calculates the edge profile by calculating an average value of luminance of the respective line that is parallel to the direction of the edge with respect to the selected region, and calculates $SFR_M$ by converting the edge profile into a frequency domain. The $SFR_P$ calculation unit 242 compensates for $SFR_M$ using $SFR_S$ stored in the storage unit 210 and the calculated $SFR_M$ at block S140. The $SFR_P$ calculation unit 242 calculates $SFR_P$.

The modeling unit 250 performs a modeling of the $SFR_P$ using a modeling function as shown in FIG. 5 at block S150. The setting unit 260 sets the frequency corresponding to the principal $SFR_P$ among the modeled $SFR_P$s as the principal frequency of $SFR_P$ at block S160.

If one region is selected, then at block S170 the judgment unit 270 determines the principal frequency set at block S160 as the resolution of the image forming device (not illustrated) that reflects the sharpness of the edge, or converts the resolution in units of frequency into a resolution in units of dpi through Equation (1). Accordingly, the characteristic of the edge that is processed in the image forming device 9 not illustrated), e.g., the resolution that reflects the sharpness, is calculated.

If plural regions are selected, that is, if plural test charts are printed through the same image forming device and the region ROI is selected from the respective test charts, the control unit 280 confirms whether all the principal frequencies corresponding to the selected regions are set at block S190. If plural test charts are printed through the same image forming device, the printed test charts are scanned at block S110, and at least one region that includes the edge is selected from the respective scanned test charts. The luminance values of the respective regions selected from the respective test charts are stored in the storage unit 210.

If plural principal frequencies are not set, the control unit 280 reads the luminance values of the region located in the next test chart, in which the principal frequency is not set, from the storage unit 210, and provides the read luminance values to the $SFR_P$ calculation unit 241. Blocks S130 to S170 and block S190 are performed until the principal frequencies of the selected regions are all set.

If the principal frequencies of the selected regions are all set from the respective test charts, the judgment unit 270 calculates the average value of the principal frequencies and judges the average value as the resolution of the image forming device (not illustrated) at block S200. In addition, the judgment unit 270 converts the calculated average value into dpi using Equation (1) at block S210. Through the above-described process, the resolution of the image forming device that reflects the edge characteristic is calculated.

If plural regions are selected as shown in FIG. 9, the $SFR_M$ calculation unit 241 calculates $SFR_M$s of the respective regions at block S130, and calculates an average $SFR_M$ of the respective $SFR_M$s. The $SFR_P$ calculation unit 242 calculates $SFR_P$ using the average $SFR_M$ and $SFR_S$ calculated at block S140. The $SFR_P$ calculation unit 242 calculates the resolution that reflects the characteristic of the edge printed through the image forming device by performing blocks S150 to S180.

According to aspects of the present invention, the resolution calculating apparatus 200 comprises the display unit 220 and the user input unit 230. However, such construction is optional, not compulsory. For example, if a scanner (not shown) is connected to another computer, the designer may select the region ROI that includes the edge from the connected computer, and the data that includes the luminance values of the selected region is transferred to the resolution calculating apparatus 200 to be stored in the storage unit 210. Thereafter, the system is automatically operated to calculate the resolution.

According to the apparatus and method of calculating a resolution according to aspects the present invention, the physical characteristic and the software characteristic of the resolution may be reflected by calculating the resolution that reflects the edge characteristic. Particularly, according to aspects of the present invention, the resolution is calculated using the test chart having a slanted edge to reflect the edge characteristic. Accordingly, the resolution calculating apparatus can calculate the resolution that reflects how sharply the edge of the image is printed in the image forming device.

In addition, the designer can determine whether to adjust the resolution by grasping the edge characteristic from the calculated resolution of the image forming device, and apply aspects of the present invention to an image quality analyzing or image processing algorithm using the result of analysis, an edge processing algorithm, and the like.

In addition, aspects of the present invention can also be embodied as computer readable codes on a computer readable recording medium. The computer readable recording medium is any data storage device that can store data which can be thereafter read by a computer system. Examples of the computer readable recording medium also include read-only memory (ROM), random-access memory (RAM), CD-ROMs, DVDs, magnetic tapes, floppy disks, and optical data storage devices. The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. For example, a method of determining a resolution may include calculating SFRs of the image forming device and determining the resolution of the image forming device using the principal SFR selected from the calculated SFRs. In addition, the apparatus to determine a resolution of the image forming device may include a controller to control the image forming device to print the test charts. Accordingly, it is intended, therefore, that the present invention not be limited to the various example embodiments disclosed, but that the present invention includes all embodiments falling within the scope of the appended claims.

What is claimed is:

1. A method of calculating a resolution of an image forming device, comprising:
   selecting a region having an edge from a test chart;
   calculating a spatial frequency response (SFR) of the image forming device that has printed the test chart using the selected region;
   calculating a principal SFR using a stored SFR to compensate for the calculated SFR for the selected region;
   setting a frequency corresponding to the calculated principal SFR as a principal frequency of the SFR of the image forming device; and
   determining the set principal frequency as the resolution of the image forming device.

2. The method according to claim 1, wherein the resolution of the image forming device is determined by calculating the set principal frequency in terms of DPI (Dots Per Inch).

3. The method according to claim 1, further comprising:
   scanning the printed test chart;
   wherein the region having the edge is selected from the scanned test chart.

4. The method according to claim 3, wherein the calculating of the SFR of the image forming device comprises:
   calculating an SFR of a scanner that has scanned the test chart;
   calculating an SFR of the selected region; and
   calculating the SFR of the image forming device using the SFR of the scanner and the SFR of the selected region.

5. The method according to claim 4, wherein the calculating of the SFR of the selected region comprises:
   calculating an average value of luminance of respective lines based on a direction in which the edge is formed with respect to the selected region; and
   obtaining the SFR of the selected region by converting the calculated average value of luminance into a frequency domain.

6. The method according to claim 4, wherein the SFR of the image forming device is calculated by dividing the SFR of the selected region by the SFR of the scanner.

7. The method according to claim 1, wherein the test chart is composed of a black space and a white space, and the edge is formed on a boundary between the black space and the white space.

8. The method according to claim 7, wherein the edge is formed in a direction of a slanted line.

9. The method according to claim 1, further comprising removing noise by modeling the calculated SFR of the image forming device.

10. The method according to claim 1, wherein the principal SFR is the SFR that approaches 0 among calculated SFRs of the image forming device normalized to be in the range of 0 to 1.

11. A method of calculating a resolution of an image forming device, comprising:
    selecting a region having an edge from a test chart;
    calculating a plurality of spatial frequency response (SFRs) of the image forming device that has printed the test chart using the selected region;
    setting a frequency corresponding to a principal SFR among the calculated SFRs of the image forming device as a principal frequency of the SFR of the image forming device; and
    determining the set principal frequency as the resolution of the image forming device;
    if plural test charts are printed, selecting regions that include the edge from the respective test charts;
    calculating the SFRs of the image forming device from the respective selected regions;
    setting the principal frequencies corresponding to the principal SFRs from the calculated SFRs of the image forming device; and
    calculating an average of the respective principal frequencies and determining the average as the resolution of the image forming device.

12. A method of calculating a resolution of an image forming device, comprising:
    selecting a region having an edge from a test chart;
    calculating a plurality of spatial frequency response (SFR) of the image forming device that has printed the test chart using the selected region;
    setting a frequency corresponding to a principal SFR among the calculated SFRs of the image forming device as a principal frequency of the SFR of the image forming device; and
    determining the set principal frequency as the resolution of the image forming device;
    if plural regions having the edge are selected from the test chart, calculating the SFRs of the image forming device from the respective selected regions;
    calculating an average of the calculated SFRs of the image forming device;
    setting the principal frequency corresponding to the principal SFR from the calculated average of the SFRs of the image forming device; and
    determining the set principal frequency as the resolution of the image forming device.

13. An apparatus to calculate a resolution of an image forming device, the apparatus comprising:
    a calculation unit to calculate a spatial frequency response (SFR) of the image forming device that has printed a test chart from a selected region if the selected region has an edge, and a principal SFR using a stored SFR to compensate for the calculated SFR for the selected region;
    a setting unit to set a frequency corresponding to the calculated principal SFR as a principal frequency of the SFR of the image forming device; and
    a judgment unit to determine the set principal frequency as the resolution of the image forming device.

14. The apparatus according to claim 13, wherein the judgment unit determines the resolution of the image forming device by calculating the set principal frequency in terms of DPI (Dots Per Inch).

15. The apparatus according to claim 13, wherein the selected region having the edge is selected from an image acquired by scanning the printed test chart.

16. The apparatus according to claim 15, wherein the calculation unit calculates an SFR of a scanner that has scanned the test chart and an SFR of the selected region, and calculates the SFR of the image forming device by dividing the SFR of the selected region by the SFR of the scanner.

17. The apparatus according to claim 16, wherein the calculation unit calculates an average value of luminance of respective lines based on a direction in which the edge is formed with respect to the selected region, and then calculates the SFR of the selected region by converting the calculated average value of luminance into a frequency domain.

18. The apparatus according to claim 13, wherein the test chart is composed of a black space and a white space, and the edge is formed on a boundary between the black space and the white space.

19. The apparatus according to claim 18, wherein the edge is a slanted line.

20. The apparatus according to claim 13, further comprising a modeling unit to remove noise by modeling the calculated SFR of the image forming device.

21. An apparatus to calculate a resolution of an image forming device, the apparatus comprising:
a calculation unit to calculate a plurality of spatial frequency response (SFRs) of the image forming device that has printed a test chart from a selected region if the selected region has an edge;
a setting unit to set a frequency corresponding to a principal SFR among the calculated SFRs of the image forming device as a principal frequency of the SFR of the image forming device; and
a judgment unit to determine the set principal frequency as the resolution of the image forming device;
wherein:
the calculation unit calculates the SFRs of the image forming device from respective regions selected from plural test charts if the plural test charts are printed;
the setting unit sets the principal frequencies corresponding to the principal SFRs from the calculated SFRs of the image forming device; and
the judgment unit calculates an average of respective principal frequencies and determines the average as the resolution of the image forming device.

22. An apparatus to calculate a resolution of an image forming device, the apparatus comprising:
a calculation unit to calculate a plurality of spatial frequency response (SFR) of the image forming device that has printed a test chart from a selected region if the selected region has an edge;
a setting unit to set a frequency corresponding to a principal SFR among the calculated SFRs of the image forming device as a principal frequency of the SFR of the image forming device; and
a judgment unit to determine the set principal frequency as the resolution of the image forming device;
wherein:
the calculation unit calculates the SFRs of the image forming device from plural regions if the plural regions having the edge are selected and calculates an average of the calculated SFRs of the image forming device;
the setting unit sets the principal frequency corresponding to the principal SFR from the calculated average of the SFRs of the image forming device; and
the judgment unit determines the set principal frequency as the resolution of the image forming device.

23. A method of determining a resolution of an image forming apparatus, the method comprising:
calculating spatial frequency responses (SFR) of the image forming apparatus using a selected region of a test chart printed by the image forming apparatus;
calculating a principal SFR using a stored SFR to compensate for the calculated SFRs for the selected region;
determining the resolution of the image apparatus based on the calculated principal SFR selected from the calculated SFRs.

24. The method according to claim 23, wherein the resolution is determined by calculating the principal SFR in terms of dots per inch (DPI).

25. A method of determining a resolution of an image forming apparatus, the method comprising:
calculating a plurality of spatial frequency responses (SFRs) of the image forming apparatus using a selected region of a test chart printed by the image forming apparatus;
determining the resolution of the image apparatus based on a principal SFR selected from the calculated SFRs;
wherein:
the spatial frequency responses of the image forming apparatus are calculated using regions selected from a plurality of test charts printed by the image forming apparatus; and
the resolution is determined based on an average of the principal SFRs for each of the regions.

26. A method of determining a resolution of an image forming apparatus, the method comprising:
calculating a plurality of spatial frequency responses (SFR) of the image forming apparatus using a selected region of a test chart printed by the image forming apparatus;
determining the resolution of the image apparatus based on a principal SFR selected from the calculated SFRs;
wherein:
the spatial frequency responses of the image forming apparatus are calculated using a plurality of selected regions of the test chart; and
the resolution is determined based on a principal SFR of an average of the SFRs of the plurality of selected regions.

27. An apparatus to determine a resolution of an image forming device, the apparatus comprising:
a calculating unit to calculate spatial frequency responses (SFR) of the image forming device using a selected region of a test chart printed by the image forming device, to calculate a principal SFR using a stored SFR to compensate for the calculated SFRs for the selected region; and
a resolution determining unit to determine the resolution of the image forming device based on the calculated principal SFR of the calculated SFRs.

28. The apparatus according to claim 27, further comprising:
a controller to control the image forming device to print the test chart.

29. The apparatus according to claim 27, wherein the resolution determining unit determines the resolution in dots per inch (DPI).

30. An apparatus to determine a resolution of an image forming device, the apparatus comprising:
a calculating unit to calculate a plurality of spatial frequency responses (SFR) of the image forming device using a selected region of a test chart printed by the image forming device;
a resolution determining unit to determine the resolution of the image forming device based on a principal SFR of the calculated SFRs; and a controller to control the image forming device to print the test chart; wherein:

the controller controls the image forming device to print a plurality of test charts;

the calculating unit calculates the spatial frequency responses using a plurality of selected regions selected from the plurality of test charts; and the resolution determining unit determines the resolution based on an average of principal SFRs of calculated SFRs for each of the plurality of regions.

31. An apparatus to determine a resolution of an image forming device, the apparatus comprising:

a calculating unit to calculate a plurality of spatial frequency responses (SFR) of the image forming device using a selected region of a test chart printed by the image forming device;

a resolution determining unit to determine the resolution of the image forming device based on a principal SFR of the calculated SFRs; and a controller to control the image forming device to print the test chart; wherein:

the calculating unit calculates the spatial frequency responses using a plurality of regions selected from the test charts; and the resolution determining unit calculates an average of the SFRs of the plurality of selected regions and determines the resolution based on a principal SFR of the calculated average.

* * * * *

UNITED STATES PATENT AND TRADEMARK OFFICE
CERTIFICATE OF CORRECTION

PATENT NO. : 8,547,590 B2  Page 1 of 1
APPLICATION NO. : 11/953225
DATED : October 1, 2013
INVENTOR(S) : Yousun Bang et al.

It is certified that error appears in the above-identified patent and that said Letters Patent is hereby corrected as shown below:

In the Claims:

In Column 12, Line 8, In Claim 11, delete "response" and insert -- responses --, therefor.
In Column 12, Line 30, In Claim 12, delete "response" and insert -- responses --, therefor.
In Column 12, Line 30, In Claim 12, delete "(SFR)" and insert -- (SFRs) --, therefor.
In Column 13, Line 25, In Claim 21, delete "response" and insert -- responses --, therefor.
In Column 13, Line 47, In Claim 22, delete "response" and insert -- responses --, therefor.
In Column 13, Line 47, In Claim 22, delete "(SFR)" and insert -- (SFRs) --, therefor.
In Column 14, Line 1, In Claim 23, delete "(SFR)" and insert -- (SFRs) --, therefor.
In Column 14, Line 30, In Claim 26, delete "(SFR)" and insert -- (SFRs) --, therefor.
In Column 14, Line 44, In Claim 27, delete "(SFR)" and insert -- (SFRs) --, therefor.
In Column 14, Line 62, In Claim 30, delete "(SFR)" and insert -- (SFRs) --, therefor.
In Column 15, Line 14, In Claim 31, delete "(SFR)" and insert -- (SFRs) --, therefor.

Signed and Sealed this
Eighteenth Day of February, 2014

Michelle K. Lee
*Deputy Director of the United States Patent and Trademark Office*